Nov. 7, 1961 G. R. HARTING 3,007,561
ELECTROMAGNETIC FRICTION DEVICE
Filed Jan. 29, 1958
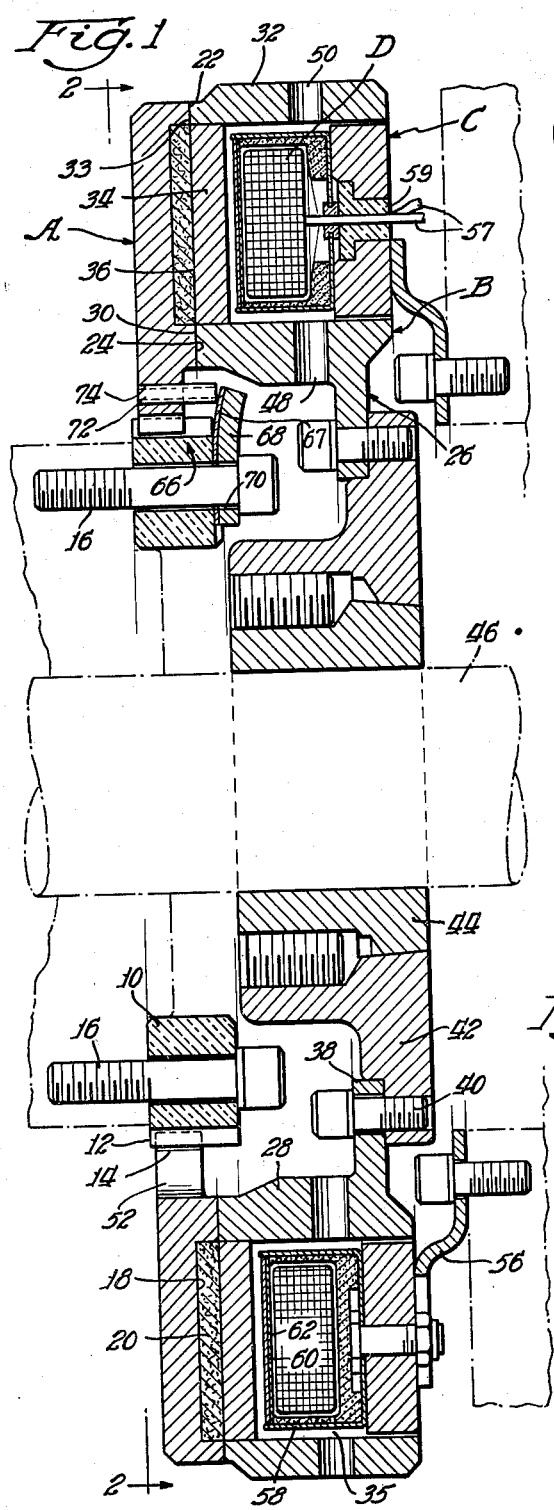
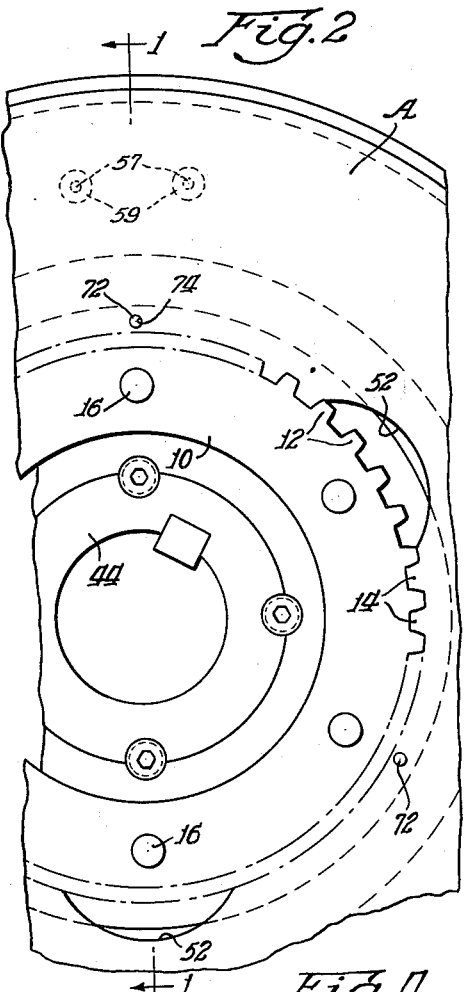
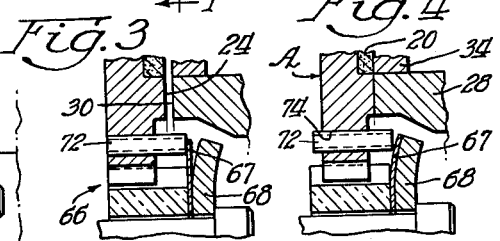
Inventor:
Glen R. Harting
By: Francis T. Drumm  Atty.

United States Patent Office 3,007,561
Patented Nov. 7, 1961

3,007,561
ELECTROMAGNETIC FRICTION DEVICE
Glen R. Harting, Rockford, Ill., assignor to Borg-Warner Corporation, Chicago, Ill., a corporation of Illinois
Filed Jan. 29, 1958, Ser. No. 712,036
8 Claims. (Cl. 192—84)

This invention relates to electromagnetic friction devices and more particularly to a clutch or brake of the type having a fixed coil particularly suitable for selectively drivingly connecting a driving member and a driven member or for braking a rotatable member.

A primary object of the invention is to provide an improved electromagnetic clutch or brake of the fixed coil type constructed and arranged so that the magnetic flux flows radially outwardly from the coil in a generally circular path for energization of radially spaced pole faces.

Another object of the invention is to provide an electromagnetic clutch or brake of the stated type in which one of the rotatable elements comprises two radially spaced portions of permeable material maintained in fixed relation by means of an impermeable annulus which functions as a wear surface and serves to direct the flux in the circular pattern.

A further object of the invention is to provide an electromagnetic clutch or brake characterized by instantaneous engagement and disengagement and wherein means are provided for effecting a circulation of cooling air across the friction faces.

Another object of the invention is to provide an electromagnetic clutch or brake having an armature, a rotor and a stator with a separate coil assembly plate, wherein the stator is of simple annular construction and is dimensioned to permit accurate fabrication and to preclude distortion under heat conditions thereby affording accurate control of the air gap between the stator and the rotor.

A further object of the invention is to provide an electromagnetic clutch or brake constructed and arranged to afford an air gap between the rotor and stator sufficiently small in axial length that the flux density is substantially reduced.

A further object of the invention is to provide an electromagnetic clutch or brake which can be rebuilt by replacing a minimum of new parts, wherein the rotor may readily be refinished, and wherein the armature containing a friction facing may be replaced.

Another object of the invention is to provide a clutch or brake of the stated type wherein the fixed coil is mounted within an annular casing, channel-shaped in cross section, opening into confronting relation to an impermeable annulus spacing the two portions of the rotor, and in which means are provided for shielding the coil from the friction heat generated in the impermeable annulus.

Another object of the invention is to provide a clutch or brake of the stated character in which means are provided for effectively separating the armature and stator upon de-energization of the coil.

A further object of the invention is to provide an electromagnetic clutch or brake in which an automatic compensating separation mechanism is provided in conjunction with a free floating spline drive.

Another object of the invention is to provide an electromagnetic clutch or brake in which the separating means takes the form of an economical flat spring and spring pin which is characterized by efficiency and effectiveness in operation.

Another object of the invention is to provide a clutch of the type described in which the coil casing is characterized by a coefficient of expansion similar to that of an epoxy resin utilized for sealing the coil so that inadvertent ejection of the resin from the coil casing under high temperature conditions is precluded.

A further object of the invention is to provide an electromagnetic friction device of the character described in which the coil casing is arranged in a chamber defined in part by the pole pieces of the rotor and in which means are provided to afford a circulation of cooling air through the chamber.

Another object of the invention is to provide an electromagnetic friction device in which adjustment for wear is automatically effected.

This invention comprises the novel constructions, arrangements, and devices to be hereinafter described and claimed for carrying out the above stated objects and such other objects as will be apparent from the following description of preferred forms of the invention, illustrated with reference to the accompanying drawings, wherein:

FIGURE 1 is an enlarged elevational sectional view taken substantially on line 1—1 of FIGURE 2;

FIGURE 2 is a reduced elevational view taken substantially on line 2—2 of FIGURE 1;

FIGURE 3 is a fragmentary elevational sectional view of the electromagnetic friction device of the present invention in disengaged position showing details of a retraction assembly;

FIGURE 3a is a view in prospective of a spring pin forming a part of the retraction assembly; and FIGURE 4 is a view similar to FIGURE 3 but showing the present electromagnetic friction device in engaged position and illustrating the position of the spring pin of the retraction assembly when the friction facings are worn.

Referring now to the drawings and more particularly to FIGURE 1 the friction device of the present invention is described as taking the form of a clutch although it will be understood that it may be operated as a brake. The device comprises a driving member A which in the present instance takes the form of an axially slidable armature of magnetic ingot iron, a driven member or rotor B preferably of dynamo steel or the like and a fixed stator C, of mild steel or the like, on which is mounted a coil D. Upon energization of the coil D, flux flows through the rotor B and attracts the armature A to afford a driving connection therebetween.

In the present instance, the armature A may be connected to a power source (not shown) by means of an annular mounting adapter 10, of molded fiber or the like, provided at its outer periphery with axially elongated teeth 12 for engaging correspondingly formed teeth 14 at the inner periphery of the armature A. The adapter 10 is shown as being piloted by its inner periphery and secured by a plurality of circumferentially spaced studs or cap screws 16 connected to the power source, as will be apparent. The inner side of the armature A is provided with an annular recess 18 for reception of a friction facing 20, the recess 18 defining a pair of radially spaced pole surfaces 22 and 24.

The rotor B includes an annular pole piece 26, substantially L-shaped in cross section, having a body portion 28 provided with a pole face 30 arranged in register with the surface 24 of the armature A and a second annular pole piece 32 having a pole face 33 in confronting relation to the surface 22 of the armature A and maintained in radial spaced relation to the body portion 28 of the pole piece 26 by means of an impermeable annulus 34, which may be of stainless steel or the like, having a wear surface 36 for engaging the friction facing 20 of the armature A. The annulus 34 may be secured to the pole pieces 26 and 32 by copper brazing or the like. It will be noted that the annulus 34 cooperates with the stator C to form a chamber 35 in which the coil D resides.

The body portion 28 has an inwardly extending radial flange 38 connected by means of a plurality of circumferentially spaced machine screws 40 to a radially outwardly extending flange 42 of a hub 44 which is affixed to a driven shaft 46 (shown in dot-and-dash lines). The hub 44 is preferably of impermeable material so that the flux from the coil D is isolated from the shaft 46.

Extending radially outwardly through the body portion 28 and the pole piece 32 of the rotor B are radial passages 48 and 50 respectively. Air for cooling may flow axially through a plurality of relieved passages 52 which interrupt the teeth of the adapter 10. The air then flows radially outwardly through the several passages 48 into the chamber 35, into contact with the coil D, and thence outwardly through the several passages 50 to atmosphere. In addition, upon de-energization of the coil D, air may flow across the pole faces 30 and 33 of the rotor B and across the confronting faces of the friction facing 20 and the annulus 34 to cool these surfaces.

According to the present invention, the stator C takes the form of a thick annulus (relative to the axial length of pole pieces 26 and 32) which has a tendency to resist distortion at high temperatures and is mounted in limited spaced relation to the pole pieces 26 and 32. Also, the thickness of the stator C assures a relatively wide path for passage of flux to the pole piece 32, across the pole face 33, through the armature A, through the pole face 30 and thence through the body portion 28 back to the stator. By this arrangement, the flux density may be substantially reduced. The stator C may be maintained in the fixed portion shown by means of an annular bracket 56, which is preferably of stainless steel or stainless clad steel in order to isolate the stator from a fixed support (shown in dot-and-dash lines) on which the bracket 56 may rest. Electric current may be supplied to the coil D by means of conductors 57 electrically insulated from the stator C by grommets 59.

The coil D is shown as being mounted within a casing 58 which is channel-shaped in cross section and is desirably of aluminum or any impermeable, highly expansive material. The coil D comprising a predetermined number of turns of conductive wire such as copper or the like which are imbedded in a sealing compound such as an epoxy resin. Aluminum has a coefficient of expansion substantially identical to that of epoxy resins and consequently inadvertent ejection of the resin from the casing 58 under high temperature conditions is precluded. In the present instance, it is preferred to mix a predetermined quantity of silica sand of 150–300 mesh with the epoxy resin so that the resulting mixture may resist heat. Furthermore, use of sand with the epoxy resin is economical.

To prevent the passage of heat from the friction facing 20 and the annulus 34 to the coil D, an annular sheet of aluminum foil 60 may be secured to the outer surface of the sealing compound and a similarly formed sheet of asbestos 62 may be superimposed thereon.

In operation, the coil D is energized and the armature A is attracted by electromagnetic flux so that it slides axially to the right, as viewed in FIGURE 1, so that the friction facing 20 is brought into engagement with the annulus 34. Considering the armature A as a driving member, rotary motion is imparted to the rotor B.

Upon de-energization of the coil D the armature A is moved axially to the left, as viewed in FIGURE 1, by means of a plurality of retraction assemblies 66, only one of which is shown in FIGURE 1. Each retraction assembly 66 includes a radially outwardly extending flat spring 67 having an opening 70 through which one of the capscrews 16 passes and a spring stop 68. Each of the springs 67 is engaged by a hollow spring pin 72 slidably received in an opening 74 adjacent to the inner periphery of the armature A. Each spring pin 72 is dimensioned to fit within the opening 74 with adequate pressure so as to afford a frictional engagement just sufficient to deflect the spring 67 against the spring stop 68 shown in FIGURE 1, and sufficient to urge the armature A rapidly to the left, as viewed in FIGURE 1, upon de-energization of the coil. As with any friction device, wear takes place on the friction surfaces. In the present instance, the retraction assemblies are designed to compensate for wear automatically. Each time the armature A is moved to the engaged position by magnetic attraction, the spring pins 72 deflect the springs 67 until the upper end of the springs 67 bottom against spring stops 68. In the event of wear as shown in FIGURE 4, armature A is still urged completely into engagement with the rotor B, since the force of magnetic attraction is many times the friction force between the spring pins 72 and the walls defining the openings 74, and the spring pins 72 relocate themselves by the amount of wear that has taken place on the friction surfaces thereby permitting the amount of release to be constant regardless of facing wear. As the friction surfaces wear, the spring pins 72 are incrementally moved to the left with respect to the armature so that they protrude from the openings 74, as clearly shown in FIGURE 4. The electromagnetic force exceeds the frictional force of the pins 72, which, in turn, exceeds the force of the springs 67. The minimum release is always the distance between the free height of spring 67 and the spring stop 68.

The teeth 12 are axially elongated to insure engagement with the teeth 14 in either the engaged or the retracted position of the armature A.

The above-described clutch exhibits important advantages over the devices of the prior art. The stator C is in the form of a flat annulus of relatively great thickness and is thus characterized by relatively little distortion when the coil D is energized. This contrasts with stators of prior art constructions which are generally of channel cross section and of relatively thin material. In stators of that type the arms of the channel tend to expand outwardly under heat conditions. In clutch constructions in which the stator is received in an annular chamber defined by the pole pieces distortion of this kind may result in frictional contact of the stationary stator with the rotating pole pieces. In prior constructions where the channel arms are arranged outwardly of the pole pieces distortion of this kind may result in an undesirably large gap. The freedom from distortion in the present instance assures more accurate control of the air gaps between the stator and the pole pieces. For example, in the present instance the air gap may be as little as .015 inch as compared to .025 inch in magnetic clutches having stators which are subject to distortion. The width of the stator C is sufficient to maintain a low level of flux density with relatively short flux lines and less flux loss. The coil D may readily be replaced merely by effecting relative movement between the stator C and the rotor B. The above-described air circulation arrangement provides for efficient operation of the clutch under all operating conditions.

It will be apparent that the stator C along with the coil D may easily be removed from the clutch structure by moving these units axially to the right, as viewed in FIGURE 1. It will be apparent also that other coil units having various voltage ratings and ampere-turn values may be substituted as required.

While I have described my invention in connection with one specific embodiment thereof, it is to be understood that this is by way of illustration and not by way of limitation and the scope of my invention is defined solely by the appended claims which should be construed as broadly as the prior art will permit.

I claim:

1. An electromagnetic friction device comprising a first member adapted to be driven by a power source, said first member being axially movable, a second member having a pair of radially spaced pole pieces, an impermeable annulus for maintaining said pole pieces in radial spaced relation, an annular stator arranged between said pole pieces in limited spaced relation thereto and cooperating with said annulus to form a chamber, a fixed coil arranged in said chamber, said first member having a recessed friction facing substantially coextensive with said annulus, said coil being operative upon energization to effect a flow of electromagnetic flux through said pole pieces so that said first member engages said second member, said coil having an annular casing of channel cross section, said casing opening into confronting relation to said annulus, means for precluding the transmission of heat from said annulus to said coil said last-named means including a layer of metal foil and a layer of asbestos interposed between said coil and said annulus, and means effective upon de-energization of said coil for separating said first element from said second element.

2. An electromagnetic friction device comprising a first member adapted to be driven by a power source, said first member being axially movable, an impermeable adapter for connecting said first member to said power source, a second member having a pair of radially spaced pole pieces, an impermeable annulus for maintaining said pole pieces in radial spaced relation, an annular flat stator arranged between said body portion and said ring portion in limited spaced relation thereto and cooperating with said annulus to form a chamber, a fixed coil arranged in said chamber, said first member having a recessed friction facing substantially coextensive with said annulus, said stator being operative upon energization to effect a flow of electromagnetic flux through said pole pieces so that said first member engages said second member, said coil having an annular casing of channel cross section, said casing opening into confronting relation to said annulus, and means for affording a circulation of air through said chamber to cool said coil, said last-named means including a plurality of circumferentially spaced passages through said first member and a plurality of passages in said pole pieces.

3. An electromagnetic friction device comprising a first member adapted to be driven by a power source, said first member being axially movable, an impermeable adapter for connecting said first member to said power source, a second member having a pair of radially spaced pole pieces, an impermeable annulus for maintaining said pole pieces in radial spaced relation, an annular flat stator arranged between said pole pieces in limited spaced relation thereto and cooperating with said annulus to form a chamber, a fixed coil arranged in said chamber, said first member having a recessed friction facing substantially coextensive with said annulus, said coil being operative upon energization to effect a flow of electromagnetic flux through said pole pieces so that said first member engages said second member, said coil having an annular casing of channel cross section, said casing opening into confronting relation to said annulus, and means for circulating air across said pole pieces upon de-energization of said coil and directing air through said chamber to cool said coil, said last-named means including a plurality of circumferentially spaced passages through said first member and a plurality of passages in said pole pieces.

4. An electromagnetic friction device comprising a driving member adapted to be driven by a power source, an impermeable adapter, said driving member being drivingly connected to said adapter and axially slidable with respect thereto, a driven member having a pair of radially spaced pole pieces, an impermeable annulus positioned axially at one side of said pole pieces for maintaining said pole pieces in radially spaced relation, an annular flat stator positioned radially between said pole pieces and axially spaced from said impermeable annulus and cooperating with said annulus to form an annular chamber, a fixed coil arranged in said chamber, said driven member being adapted to be actuated by said driving member upon energization of said coil, and means for automatically compensating for wear of said driving and driven members, said means including a plurality of spring pins receivable in a corresponding number of openings in said driving member, a plurality of flat springs secured to said adapter, one of said pins being adapted to engage each of said flat springs, said springs being adapted to retract said driving member when said coil is de-energized, said pins being adapted to engage the edges of said driving member defining said openings with a force greater than the force of said springs but less than the electromagnetic force generated by said coil whereby the pins move relative to said driving member as wear occurs in said driving member and said driven member and engagement of said driving and driven members is assured at all times.

5. An electromagnetic friction device comprising a driving member, an impermeable adapter splined to said driving member, a driven member having radially spaced pole pieces, an impermeable annulus interposed between said pole pieces to maintain said pole pieces in spaced relation, an annular flat stator cooperating with said pole pieces and said annulus to form an annular chamber, a readily replaceable coil mounted in said chamber, said coil being operative upon energization to afford a flow of electromagnetic flux through said pole pieces to attract said driving member to said driven member and effect rotation of said driven member, and means for retracting said driving member upon de-energization of said coil, said means including a plurality of flat springs secured to said adapter, a corresponding number of openings in said driving member, a spring pin received in each of said openings, said spring pins being dimensioned to exert a force against the edges of said driving member defining said openings which exceeds the force of said springs but is less than the electromagnetic force whereby relative movement of said pins with respect to said driving member is afforded as wear occurs in said driving and driven members and engagement of said members is assured when said coil is energized.

6. An electromagnetic friction device comprising a first member adapted to be driven by a power source, said first member being axially movable, a second member having a pair of radially spaced pole pieces, a magnetically impermeable annulus for maintaining said pole pieces in radially spaced relation, an annular stator arranged between said pole pieces in limited spaced relation thereto and cooperating with said annulus and said pole pieces to form a chamber, a fixed coil arranged in said chamber, said first member having a recessed friction facing, said coil being operative upon energization to effect the flow of electromagnetic flux through said pole pieces so that said first member engages said second member, said coil having an annular casing of channel cross section, said casing opening into confronting relation to said annulus, and means for precluding the transmission of heat from said annulus to said coil, said last-named means including a layer of metal foil and a layer of asbestos interposed between said coil and said annulus.

7. An electromagnetic friction device comprising a first member adapted to be driven by a power source, said first member being axially movable, a magnetically impermeable adaptor for connecting said first member to said power source, a second member having a pair of radially spaced pole pieces, a magnetically impermeable annulus for maintaining said pole pieces in radially spaced relation, said annulus and pole pieces forming a rotor, an annular stator arranged between said pole pieces in limited spaced relation thereto and cooperating with said annulus and said pole pieces to form a chamber, a fixed coil arranged in said chamber, said coil being operative upon energization to effect a flow of electromagnetic flux through said pole pieces so that said first member engages said second member, and means for circulating air across said pole pieces upon de-energization of said coil and directing air through said chamber to cool said coil, said last-named means comprising a plurality of circumferentially spaced passages through said first member and a plurality of passages in said pole pieces to communicate the inner and outer peripheries of said rotor with said chamber.

8. An electromagnetic friction device comprising a driving member adapted to be driven by a power source, a magnetically impermeable adaptor, said driving member being drivingly connected to said adaptor and axially slidable with respect thereto, a driven member having a pair of radially spaced pole pieces, a magnetically impermeable annulus positioned axially at one side of said pole pieces for maintaining said pole pieces in radially spaced relation, an annular stator positioned radially between said pole pieces and axially spaced from said impermeable annulus and cooperating with said annulus and said pole pieces to form a chamber, a fixed coil arranged in said chamber, said driven member being adapted to be actuated by said driving member upon energization of said coil, and means for automatically compensating for wear of said driving and driven members, said means including a plurality of spring pins each receivable in one of a plurality of openings in said driving member, a plurality of leaf springs secured to said adaptor, each pin being adapted to engage one of said leaf springs, said leaf springs being adapted to retract said driving member when said coil is deenergized by working against said pins, said pins being adapted to engage the walls of said driving member defining said openings with a frictional force greater than the force of said leaf springs but less than the electromagnetic force generated by said coil whereby the pins shift relative to said driving member in incremental steps as wear occurs in said driving member and said driven member thereby assuring at all times the engagement of said driving and driven members.

References Cited in the file of this patent

UNITED STATES PATENTS

| | | |
|---|---|---|
| 1,746,365 | Schunemann | Feb. 11, 1930 |
| 2,437,670 | Adamson | Mar. 16, 1948 |
| 2,684,744 | Myers | July 27, 1954 |
| 2,695,695 | Gilfillan et al. | Nov. 30, 1954 |
| 2,728,878 | Sperr | Dec. 27, 1955 |
| 2,729,318 | Harter | Jan. 3, 1956 |
| 2,739,684 | Meyer | Mar. 27, 1956 |
| 2,779,448 | Lambach et al. | Jan. 29, 1957 |
| 2,801,719 | Clark | Aug. 6, 1957 |
| 2,808,917 | Harter | Oct. 8, 1957 |
| 2,823,776 | Pierce | Feb. 18, 1958 |
| 2,847,102 | Tideman et al. | Aug. 12, 1958 |
| 2,853,165 | Walter et al. | Sept. 23, 1958 |
| 2,857,998 | Harter | Oct. 28, 1958 |
| 2,860,403 | Meyer | Nov. 18, 1958 |